(12) United States Patent
Kudoh

(10) Patent No.: US 8,078,041 B2
(45) Date of Patent: Dec. 13, 2011

(54) SHAKE CORRECTION UNIT AND IMAGING APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/688,771

(22) Filed: Jan. 15, 2010

(65) Prior Publication Data
US 2010/0183288 A1   Jul. 22, 2010

(30) Foreign Application Priority Data

Jan. 19, 2009   (JP) ................................. 2009-009354

(51) Int. Cl.
G03B 17/00 (2006.01)
G03B 9/08 (2006.01)
G03B 9/02 (2006.01)
H04N 5/228 (2006.01)
H04N 5/238 (2006.01)
G02B 27/64 (2006.01)
G02B 9/08 (2006.01)

(52) U.S. Cl. ....... 396/55; 396/452; 396/505; 348/208.7; 348/208.11; 348/363; 359/557; 359/740

(58) Field of Classification Search ................ 396/55, 396/52, 449, 452, 505; 348/208.99, 208.4, 348/208.7, 208.11, 208.12, 363; 359/557, 359/738–740
See application file for complete search history.

(56) References Cited

U.S. PATENT DOCUMENTS
2006/0285839 A1 * 12/2006 Tomita ........................... 396/55

FOREIGN PATENT DOCUMENTS

| | | |
|---|---|---|
| CN | 1892295 A | 1/2007 |
| JP | 10-307248 A | 11/1998 |
| JP | 2001-324663 A | 11/2001 |
| JP | 2002-072086 A | 3/2002 |
| JP | 2006350157 A | 12/2006 |
| JP | 2008-083079 A | 4/2008 |
| JP | 2008-160175 A | 7/2008 |
| JP | 2008-209434 A | 9/2008 |

* cited by examiner

*Primary Examiner* — Rochelle-Ann J Blackman

(57) ABSTRACT

A shake correction unit comprises a first lens unit that holds a first lens and is movable in a direction perpendicular to an optical axis of the first lens during a shake correction operation and a second lens unit that holds a second lens and is attached to the first lens unit and moves in a direction perpendicular to the optical axis together with the first lens unit during the shake correction operation, at least one of a shutter and an iris diaphragm having a changeable opening diameter is disposed between the first lens unit and the second lens unit.

20 Claims, 11 Drawing Sheets

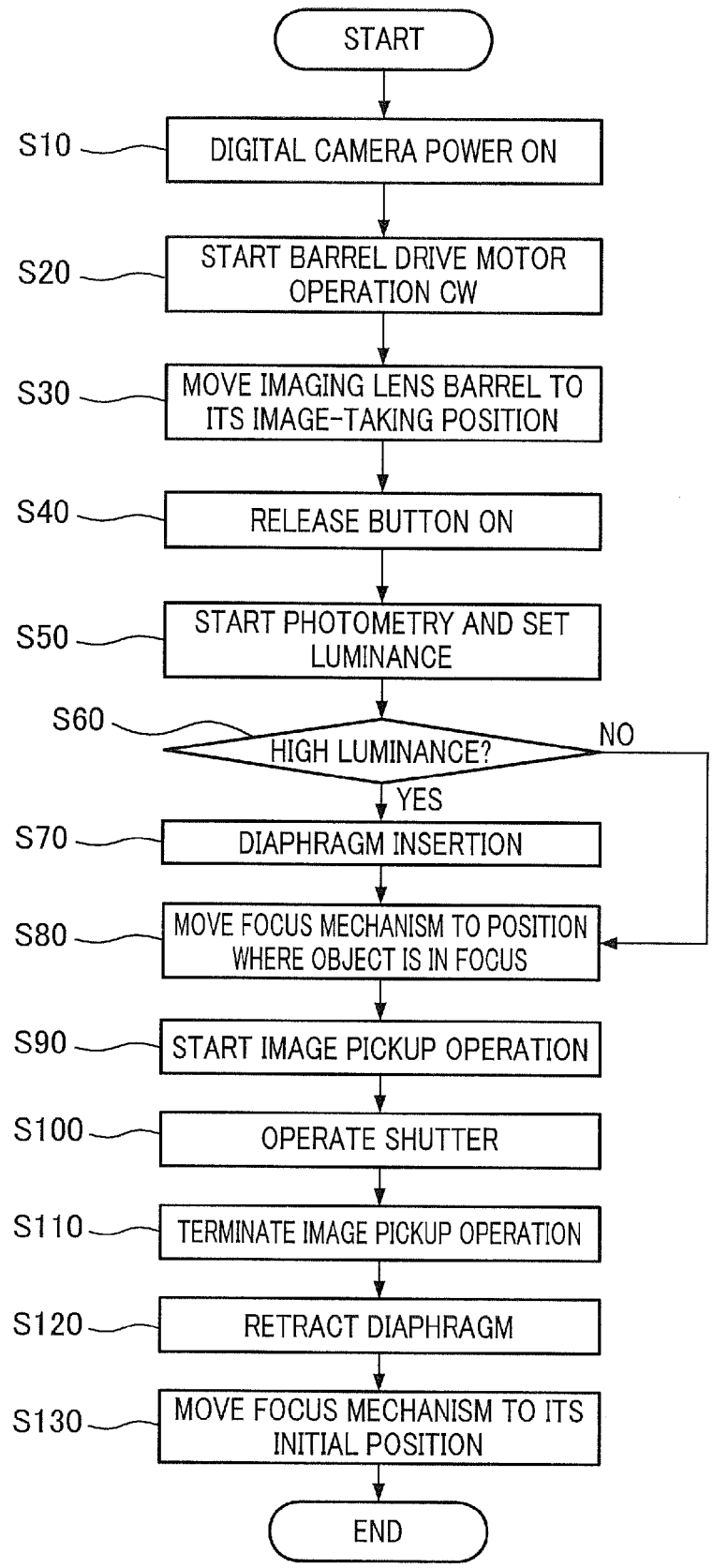

SHAKE CORRECTION UNIT AND IMAGING APPARATUS

BACKGROUND OF THE INVENTION

1. Field of the Invention

The present invention relates to a shake correction apparatus and an imaging apparatus which includes the shake correction apparatus.

2. Description of the Related Art

Conventionally, a camera having a zoom unit that moves a plurality of optical lenses so as to change an imaging magnification is widely used (see Japanese Patent Laid-Open No. 2001-324663). In Japanese Patent Laid-Open No. 2001-324663, a plurality of lens holding units configured to hold a plurality of lenses is moved in the optical axis direction by a cam ring, and the movement of the lens holding unit in its rotational direction is regulated by a rotation regulating unit. With this arrangement, the optical lens can be moved to a defined position.

In recent years, high-magnification cameras have rapidly advanced. As the high-magnification camera advances, image blur, which causes a photograph taken by the operator to be blurred, may occur due to vibration, so-called "hand shake", imparted to the camera by the operator when a photograph is taken particularly at the telescopic side. As a countermeasure, a method in which an image pickup element is moved in a direction perpendicular to the optical axis so as to cancel such vibration has been known (see Japanese Patent Laid-Open No. 2008-160175). A method in which an image pickup element is moved in a direction perpendicular to the optical axis so as to synchronize a lens group in a lens barrel group with hand shake to cancel such vibration has also been known (see Japanese Patent Laid-Open No. 2008-209434).

However, in the method disclosed in Japanese Patent Laid-Open No. 2008-160175, an image pickup element such as a CCD image sensor, a CMOS image sensor, or the like is to be directly moved, which uses peripheral space due to the relationship with an actuator to be driven, resulting in a tendency for the size of device to increase.

Also, in the method for moving a lens group disclosed in Japanese Patent Laid-Open No. 2008-209434, a lens group to be moved is generally operated as one block. Conventionally, it is known that the insertion of an iris diaphragm and a shutter between the lens groups is effective in decreasing the size of the overall optical system. Space may occur in one lens group for an optical configuration, and the overall optical system can be reduced in size by the effective utilization of such space.

However, it is difficult to operate lens groups in which an iris diaphragm and a shutter are inserted therebetween as a shake correction lens group due to the size reduction. In other words, the diaphragm and the shutter include a mechanism and an actuator for driving them, resulting in a tendency for both the size and the weight to increase. Therefore, when they are forced to be operated together with the shake correction lens group, an actuator for a shake correction operation is increased in size. Consequently, it becomes difficult to decrease in the size of the overall optical system, resulting in higher power consumption.

SUMMARY OF THE INVENTION

An aspect of the present invention is a shake correction unit which includes a first lens unit that holds a first lens and is movable in a direction perpendicular to an optical axis of the first lens during a shake correction operation, and a second lens unit that holds a second lens and is attached to the first lens unit and moves in a direction perpendicular to the optical axis together with the first lens unit during the shake correction operation. At least one of a shutter and an iris diaphragm having a changeable opening diameter is disposed between the first lens unit and the second lens unit.

Further features of the present invention will become apparent from the following description of exemplary embodiments with reference to the attached drawings.

BRIEF DESCRIPTION OF THE DRAWINGS

FIG. 13 is a flowchart of a process of the operation of the digital camera of the present embodiment, from power-on to termination of shooting.

DESCRIPTION OF THE EMBODIMENTS

Hereinafter, an embodiment for carrying out the invention will now be described with reference to the accompanying drawings. As described below, each drawing shown in the following is a schematic view, and the respective portions are emphasized in both size and shape for ease of understanding. In the following description, specific numerical values, shapes, and operations are shown, which may be appropriately modified. Furthermore, to facilitate understanding of the clear correspondence of each figure, the origin is not particularly defined, but X-Y-Z orthogonal coordinates are provided in each figure as a coordinate system for simply indicating X, Y, and Z directions, assuming that an upper direction of the camera is set as the Y-plus direction when the camera is in the normal position. As used herein, "normal position" refers to the camera's position at which the optical axis of an imaging optical system in a lens barrel (hereinafter referred to simply as "optical axis") is horizontal and the longitudinal direction of an imaging screen is also in the horizontal direction. Hereinbelow, it is assumed that an upper direction of the camera is set as a Y-plus direction and a front direction of the camera is set as a Z-plus direction (i.e., optical axis object direction).

Figure 1:
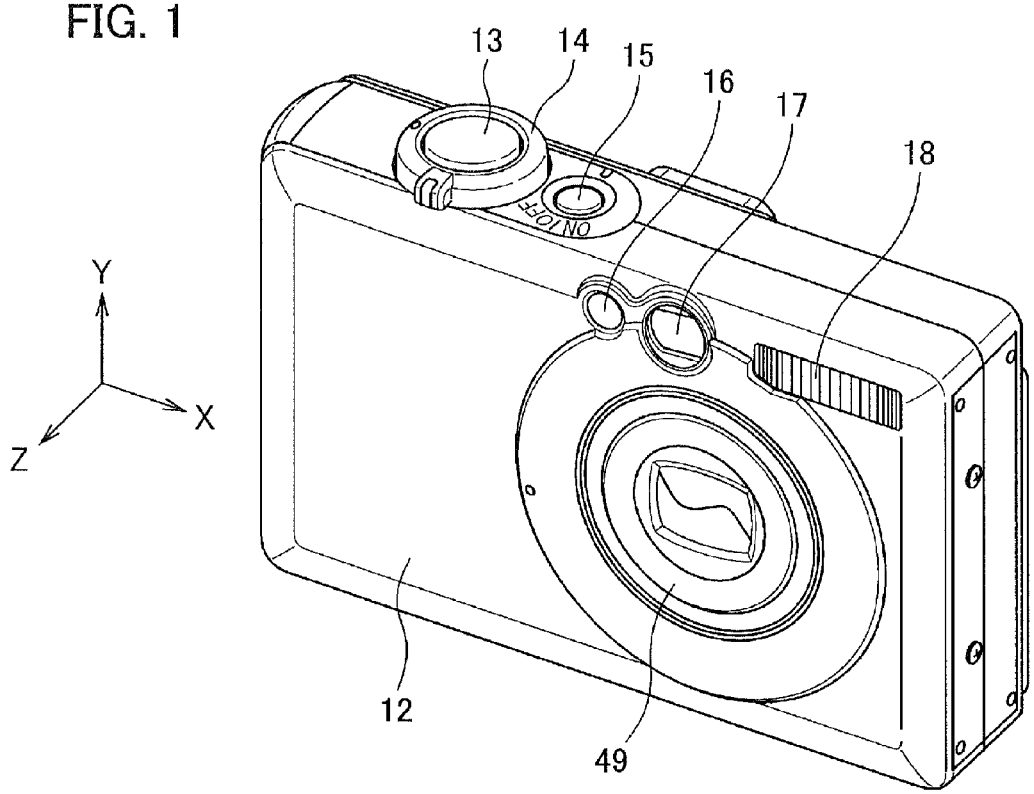
FIG. 1 is a perspective view showing an embodiment of a digital camera provided with the shake correction unit according to the present invention in a power-off state.
Figure 2:
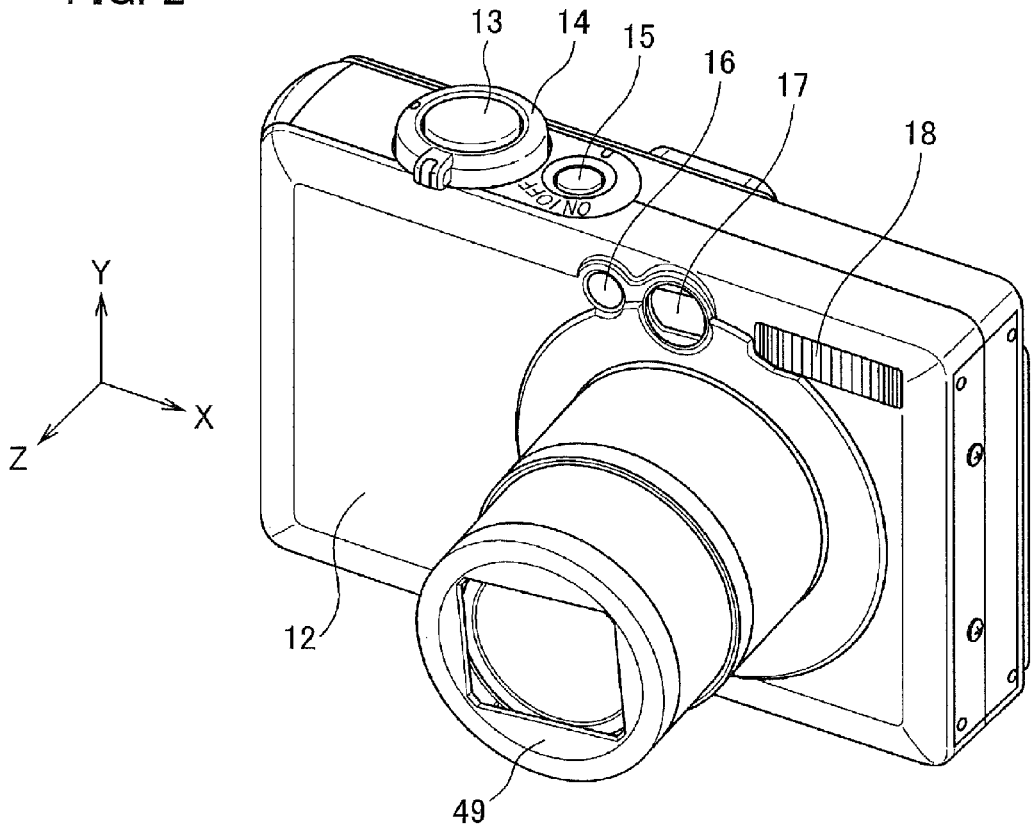
FIG. 2 is a perspective view of the digital camera in a power-on state.
Figure 3:
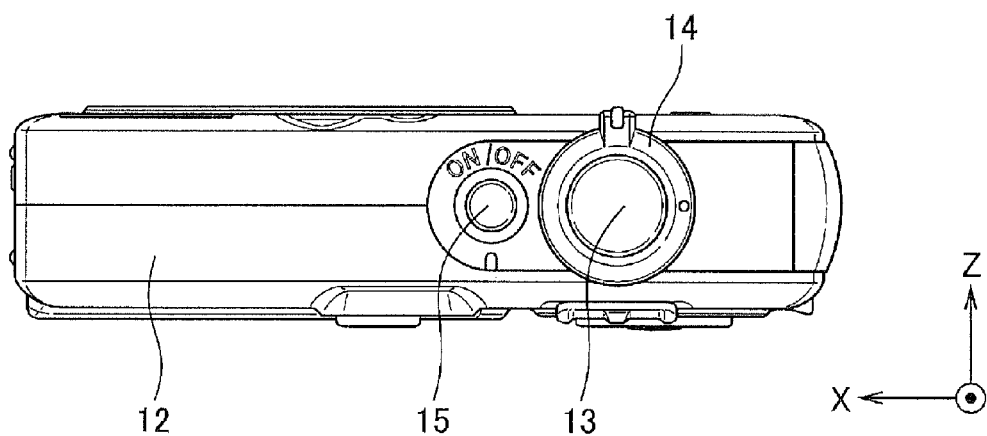
FIG. 3 is a top plan view of the digital camera in a power-off state.
Figure 4:
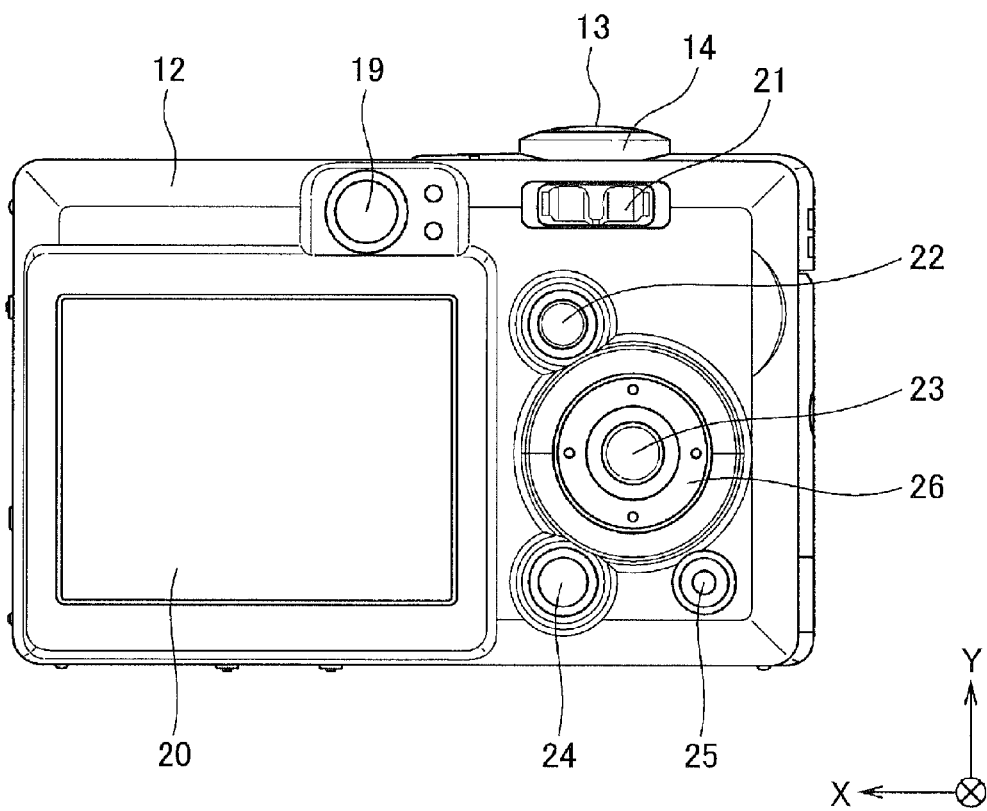
FIG. 4 is a rear view of the digital camera.
Figure 5:
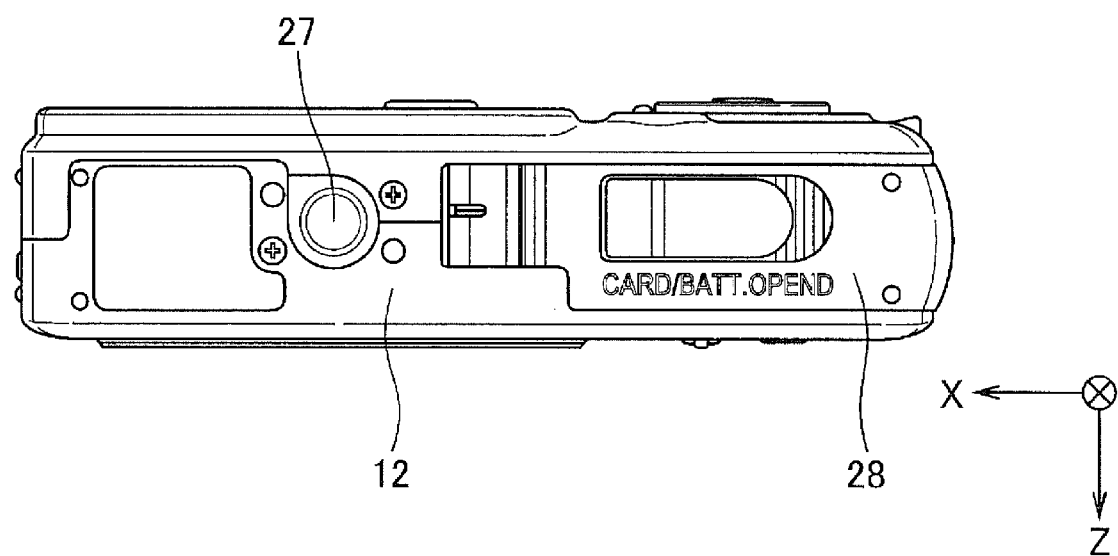
FIG. 5 is a bottom view of the digital camera in a power-off state.
Figure 6:
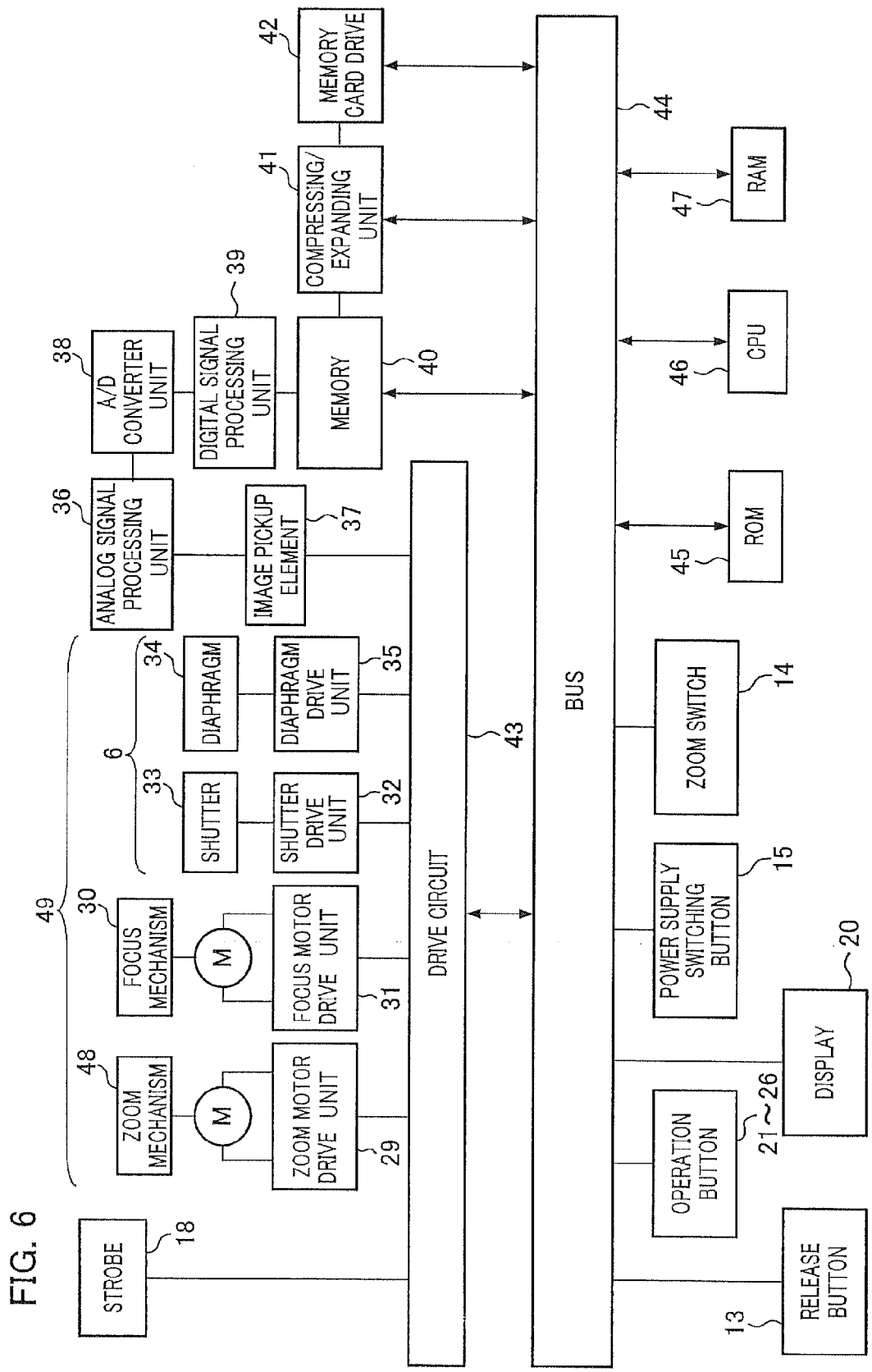
FIG. 6 is a block diagram showing the internal configuration of the digital camera.

FIG. 1 is a perspective view showing an embodiment of a digital camera provided with the shake correction unit according to the present invention in a power-off state. FIG. 2 is a perspective view of the digital camera in a power-on state. FIG. 3 is a top plan view of the digital camera in a power-off state. FIG. 4 is a rear view of the digital camera. FIG. 5 is a bottom view of the digital camera in a power-off state. FIG. 6 is a block diagram showing the internal configuration of the digital camera. The digital camera 12 of the present embodiment is an imaging apparatus having a zoom unit that can change an imaging magnification.

On the front surface of the digital camera 12 of the present embodiment, there are arranged a view finder 17 for determining a composition of an object, an auxiliary light emitting unit 16 for assisting a light source in photometric/distance measurement, a strobe 18, and a photographic lens barrel 49. On the top surface of the digital camera 12, there are arranged a release button 13, a power supply switching button 15, and a zoom switch 14. By the operation of the zoom switch 14, a zoom motor drive unit 29 is controlled via a drive circuit 43 to carry out zoom operation by a zoom unit 48. A stored image, which is displayed on a display 20, can be enlarged and reduced by the operation of the zoom switch 14 (i.e., digital zoom). On the bottom surface of the digital camera 12, there are arranged a tripod mounting unit 27, and a card battery cover 28 in which a memory card drive 42 and a battery inserting unit (not shown) are provided. On the rear surface of the digital camera 12, there are arranged operation buttons 21, 22, 23, 24, 25, and 26 for the switching of various functions. Further, on the rear surface of the digital camera 12, there are arranged a display 20 formed by an LCD (Liquid Crystal Display), and a view finder eyepiece 19. The operator selects operation modes of the digital camera 12, for example, such as a shooting mode, a reproduction mode, a moving image shooting mode, or the like by the operation buttons 21, 22, 23, 24, 25, and 26. The display 20 displays image data stored in a memory 40 or image data read from a memory card on a screen. Further, when the reproduction mode is selected, the display 20 reduces the image sizes of a plurality of picked-up image data and displays the reduced image data on the screen.

A control unit includes a CPU 46, a ROM 45, and a RAM 47. The control unit is connected to various component elements such as the release button 13, the operation buttons 21 to 26, the display 20, the memory 40, the memory card drive 42, and the like via a bus 44. The drive circuit 43 connected to a control system via the bus 44 is connected to the zoom motor drive unit 29, a focus motor drive unit 31, a shutter drive unit 32, a diaphragm drive unit 35, an image pickup element 37, and the strobe 18. These units are drivingly controlled by signals from a control system. The ROM 45 stores control programs for controlling the above-mentioned respective functional component elements. The RAM 47 stores data used for the respective control programs.

When the operator switches the power supply from the power-off state to the power-on state by operating the power supply switching button 15, the CPU 46 reads out a control program from the ROM 45 and starts an initial operation. More specifically, the control unit moves the photographic lens barrel 49 to a predetermined shooting-permitting area and starts up a photographing function, followed by entering a shooting standby state. When the operator presses the release button 13 for shooting, the control unit detects the brightness of an object by the image pickup element 37 and sets a diaphragm value and a shutter speed based on a photometric value obtained by the detection. Further, the control unit determines whether or not flashing the strobe 18 is to be used. The operator can also operate the operation button 21 to thereby select in advance whether or not to forcibly flash the strobe 18. Then, the control unit performs ranging to measure a distance to the object, and drives a focus unit 30 via the focus motor drive unit 31 to move a focus lens group (not shown) to a predetermined focus position. Further, the control unit controls the opening and closing of a shutter 33, thereby causing an image to be captured by the image pickup element 37.

The image pickup element 37 is an imaging unit that accumulates electrical charge corresponding to the amount of light incident to the image pickup element 37 according to an exposure control value, converts the electrical charge into an image signal, and outputs the result to an analog signal processing unit 36. As the image pickup element 37, a CCD (Charge Coupled Device) image sensor and a CMOS (Complementary Metal Oxide Semiconductor) image sensor are used. The analog signal processing unit 36 carries out analog processing on the received image signal and then outputs the processed image signal to an A/D converter unit 38. The A/D converter unit 38 converts the received analog data of the processed image signal to digital data. Then, the digital data is output to a digital signal processing unit 39 to be processed therein. Finally, the digital data is stored in the memory 40. When an operation button 22 is operated, the digital data stored in the memory 40 is subjected to compression processing and the like, such as JPEG compression or TIFF compression, by a compressing/expanding unit 41. Then, the compressed digital data is output to the memory card installed in the memory card drive 42 and is stored in the memory card. It should be noted that when the digital camera 12 is not provided with the memory 40, digital data processed by the digital signal processing unit 39 is output to the compressing/expanding unit 41 to be stored in the memory card installed in the memory card drive 42.

The control unit causes the compressing/expanding unit 41 to perform expansion processing on the image data stored in the memory 40 or the image data stored in the memory card drive 42, and causes the display 20 to display the processed image data via the bus 44. When viewing the image data displayed on the display 20 and determining that the image is unnecessary, the operator can operate the operation button 23 to delete the image.

Figure 7:
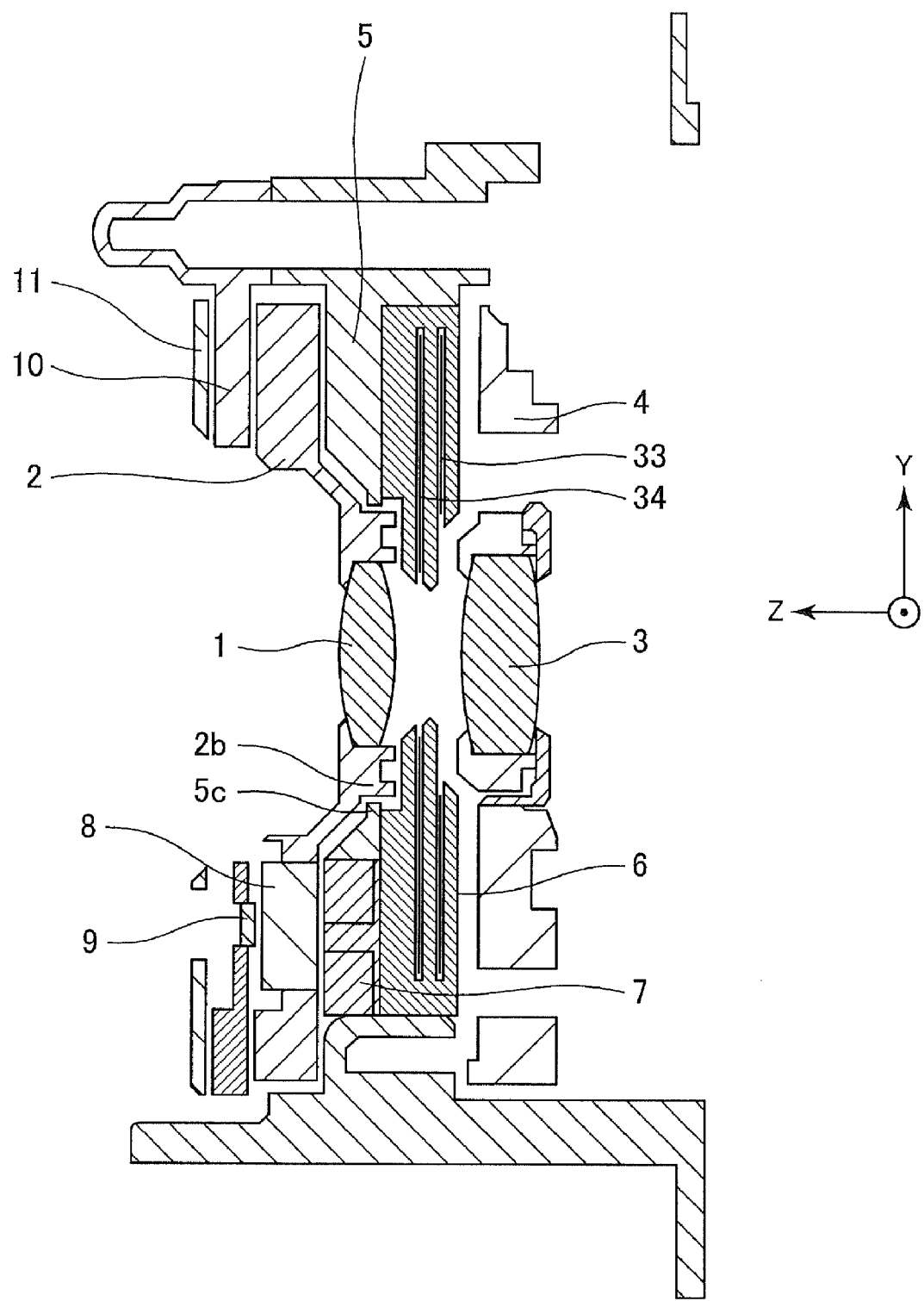
FIG. 7 is a cross-sectional view of a shake correction unit.
Figure 8:
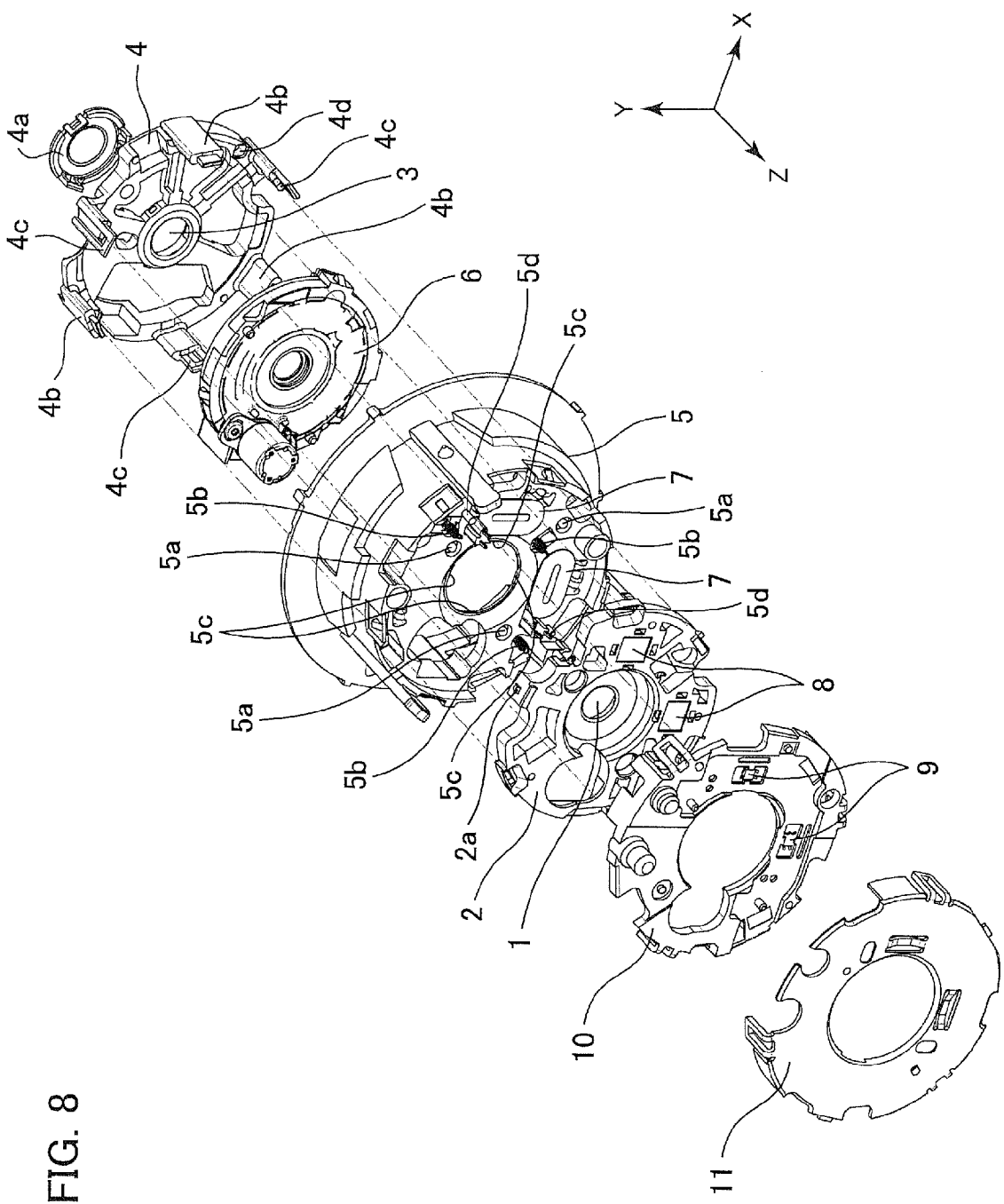
FIG. 8 is a front side exploded perspective view of the shake correction unit.
Figure 9:
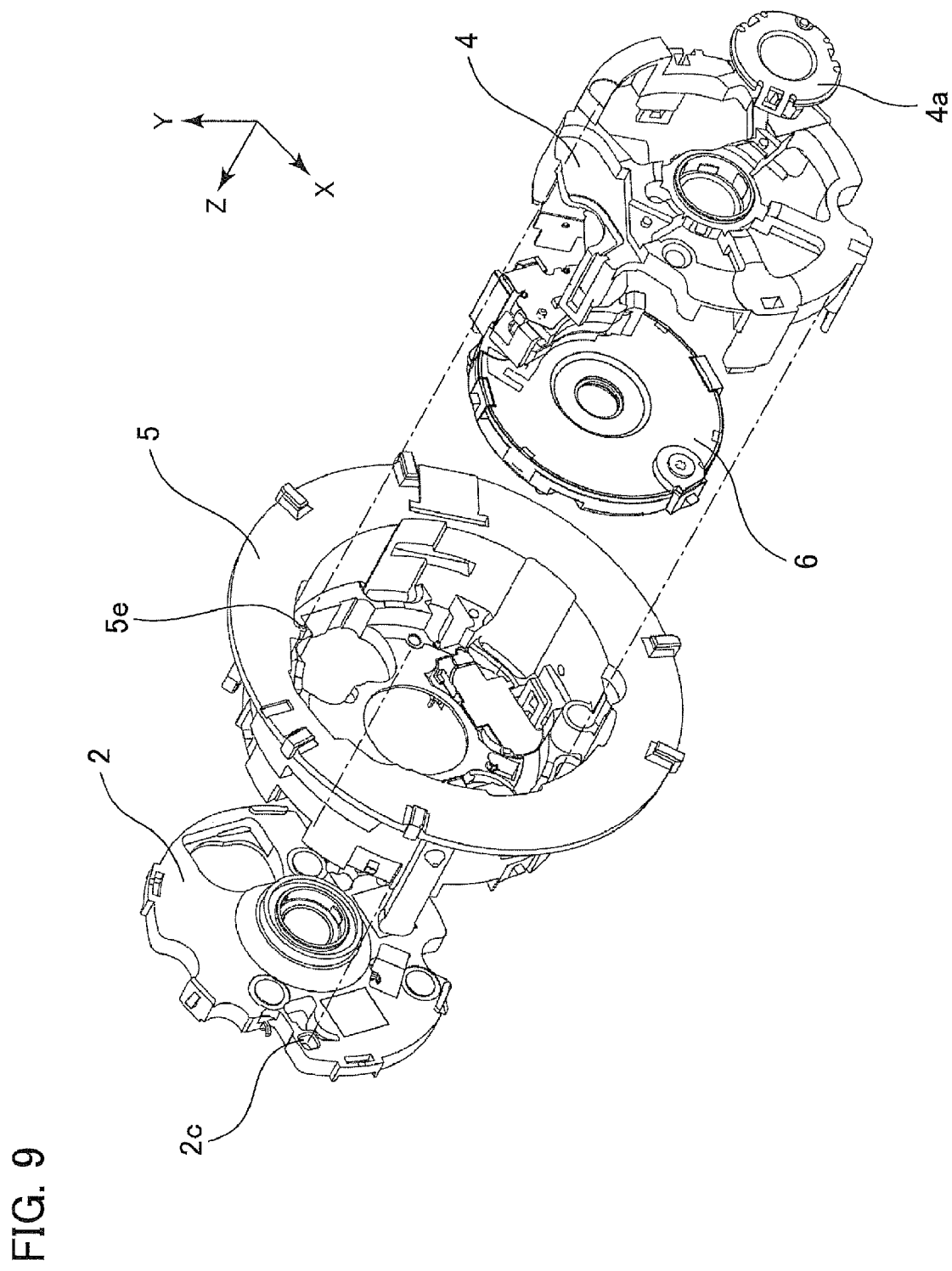
FIG. 9 is a rear side exploded perspective view of the shake correction unit.
Figure 10:
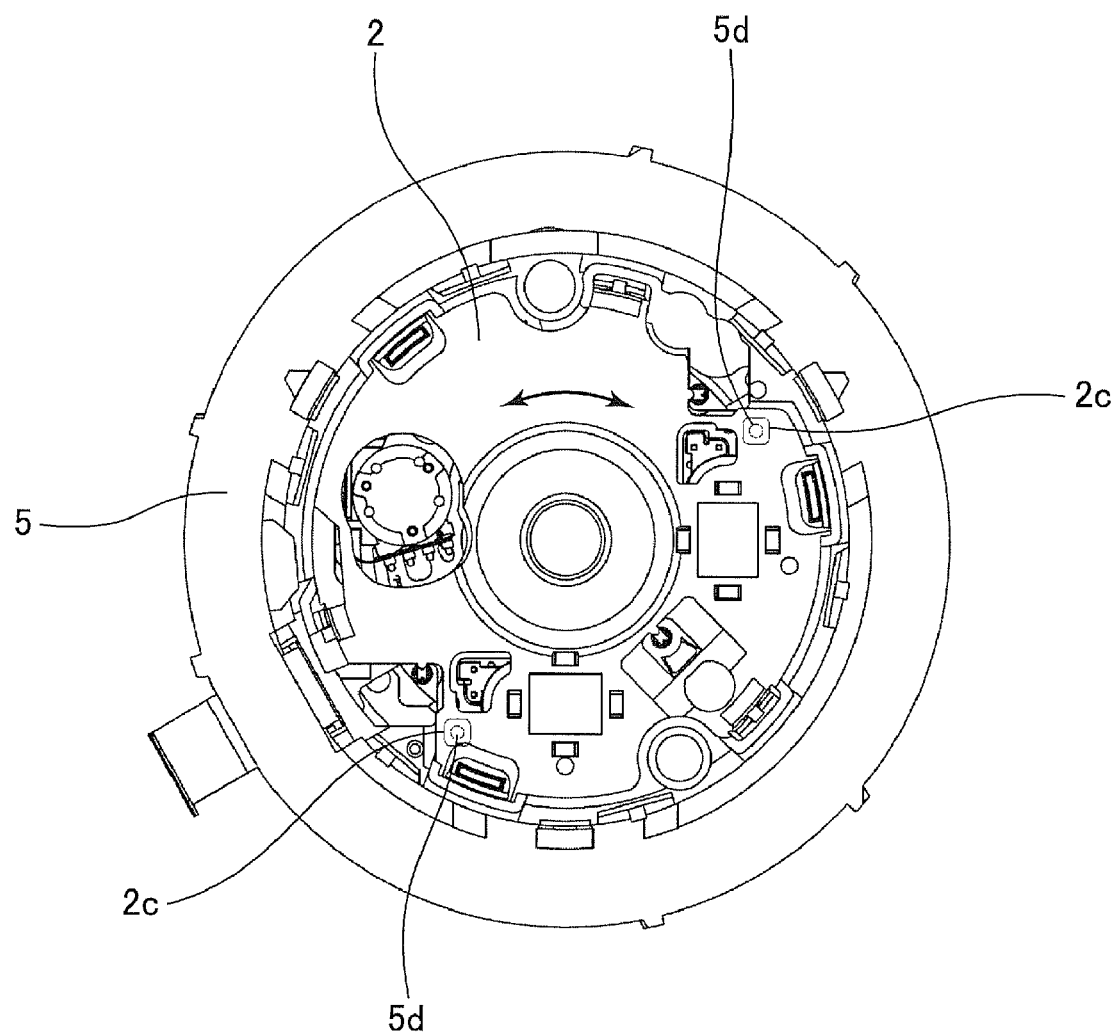
FIG. 10 is a front view of the shake correction unit.
Figure 11:
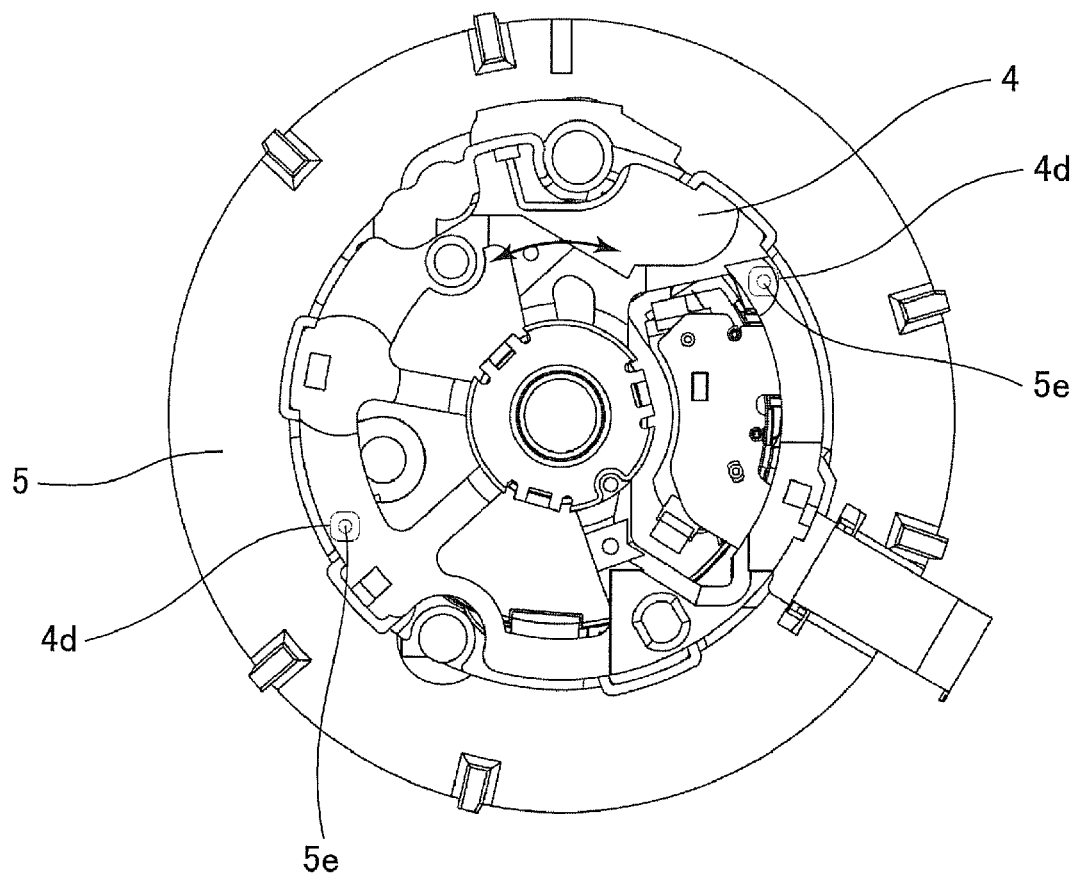
FIG. 11 is a rear view of the shake correction unit.
Figure 12:
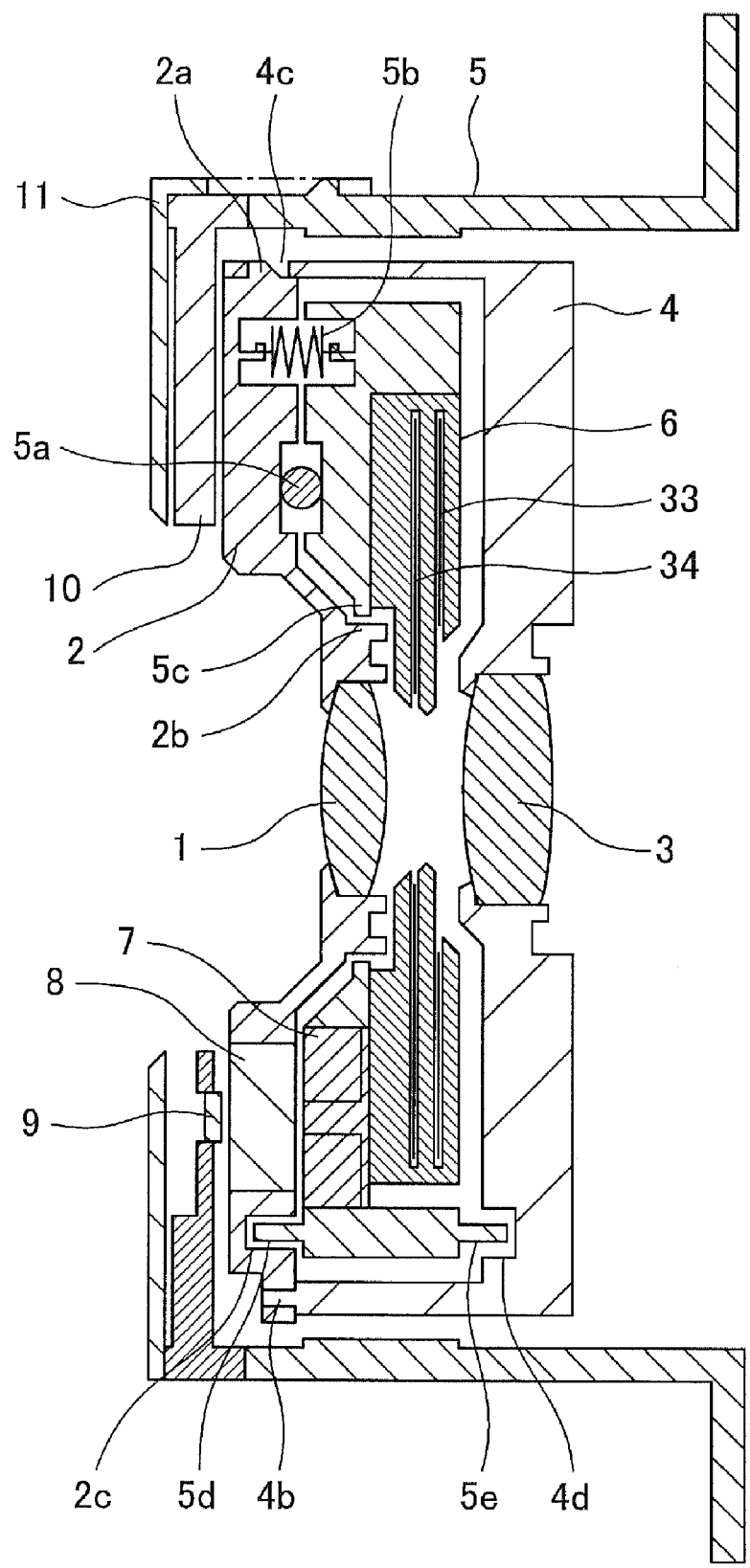
FIG. 12 is a schematic cross-sectional view of the shake correction unit.

Next, a description will be given of the shake correction unit provided in the photographic lens barrel 49 of the present embodiment. FIG. 7 is a cross-sectional view of the shake correction unit. FIG. 8 is a front side exploded perspective view of the shake correction unit. FIG. 9 is a rear side exploded perspective view of the shake correction unit. FIG. 10 is a front view of the shake correction unit. FIG. 11 is a rear view of the shake correction unit. FIG. 12 is a schematic cross-sectional view of the shake correction unit.

The shake correction unit of the present embodiment includes, from the object side (Z plus side) along the optical axis, a cover member 11, a magnetic detecting/holding unit 10, a first lens holding member 2 (first lens unit), a base member 5, a diaphragm shutter unit 6, a second lens holding member 4 (second lens unit). The shake correction unit is supported by a drive unit (not shown), and moves in the optical axis direction as a whole in accordance with zoom operation or collapsible operation.

The cover member 11 fixes the magnetic detecting/holding unit 10 to the base member 5. The magnetic detecting/holding unit 10 includes a magnetic detecting unit 9 at a position opposite to a magnet 8 to be described below. As the magnetic detecting unit 9, for example, a Hall element is used. The first lens holding member 2 holds a first lens 1. Also, the magnet 8 is fixed to the first lens holding member 2 at a position opposite to a shake correction coil 7 to be described below.

The base member 5 is a unit that forms the base of the shake correction unit. The shake correction coil 7 is fixed to the base member 5. The aforementioned shake correction coil 7, the magnet 8, and the magnetic detecting unit 9 are used as one set for the actuator and the position detector of the first lens holding member 2 during a shake correction operation. Two pairs of the shake correction coil 7, the magnet 8, and the magnetic detecting unit 9 are provided. One of the pairs relates to the driving of the first lens holding member 2 and the second lens holding member 4 in the X direction during a shake correction operation, and the other pair relates to the driving of the first lens holding member 2 and the second lens holding member 4 in the Y direction. Balls 5a are disposed at three positions in front of the base member 5 (Z plus side), and the first lens holding member 2 is disposed by sandwiching the balls 5a. Furthermore, extension springs 5b are hooked over the base member 5 and the first lens holding member 2, the first lens holding member 2 is urged toward the base member 5 by the extension springs 5b. Hence, the first lens holding member 2 is pressed toward the base member 5 side via the balls 5a so as to be movable in a direction perpendicular to the optical axis.

The diaphragm shutter unit 6 is disposed on the rear surface (Z minus side) of the base member 5. The diaphragm shutter unit 6 is an integrated unit of a diaphragm 34 and the shutter 33 that functions as a diaphragm and a shutter, and is integrally fixed to the base member 5 in a snap-fit structure. The diaphragm 34 of the present embodiment is an iris diaphragm that changes while maintaining the circular shape of the opening diameter.

The second lens holding member 4 holds a second lens 3 and is disposed at the rear surface of the diaphragm shutter unit 6. The second lens 3 serves as a shake correction lens group together with the first lens 1 described above. A mask 4a is attached to the rear surface of the second lens 3. The second lens holding member 4 is integrally provided with receiving units 4b and engaging units 4c extending forwardly (Z plus side) in an arm-like manner. The receiving units 4b and the engaging units 4c extend through the through holes provided in the base member 5, and each of them extends forwardly of the base member 5. The receiving units 4b receive the first lens holding member 2, and the engaging units 4c are coupled with engaged units 2a provided in the first lens holding member 2 in a snap-fit structure. In order to ensure the coupling between the first lens holding member 2 and the second lens holding member 4, the top surface of the receiving units 4b may be adhesively secured.

By means of a configuration described above, the diaphragm shutter unit 6 fixed to the base member 5 can be provided within a shake correction lens group, i.e., at a position between the first lens 1 and the second lens 3. The first lens holding member 2 and the second lens holding member 4 move relatively in an integral manner in a direction perpendicular to the optical axis for carrying out a shake correction operation with respect to the diaphragm shutter unit 6, the magnetic detecting/holding unit 10, and the like that are fixed to the base member 5.

An aperture through which an imaging light flux passes is provided in the central portion of the base member 5, and a part near the center of the first lens holding member 2 is inserted in the aperture. Movement range regulating units 5c, which serve as a mechanical stopper for physically restricting the range of movement of the first lens holding member 2, are provided in the interior wall portion of the aperture. Regulated movement range units 2b, which are provided near the first lens 1 of the first lens holding member 2, abut the movement range regulating units 5c, and thereby the movable range of the first lens holding member 2 is restricted. In the present embodiment, the movement range regulating units 5c are composed of a plane parallel to the X axis and a plane parallel to the Y axis. With this arrangement, the movable range of the first lens holding member 2 in a shake correction operation is a square when viewed from a direction along the Z axis.

In such a configuration described above, the first lens holding member 2 and the second lens holding member 4, which operate during a shake correction operation, move up and down and right and left (Y direction and X direction) when they are not drive-controlled. Consequently, the first lens holding member 2 and the second lens holding member 4 are also rotated (rolling) freely in a direction around the optical axis as shown by arrows in FIG. 10 and FIG. 11. Too large a rotational travel may cause the ejection of the balls 5a and the deformation of the extension springs 5b, resulting in damage to the shake correction unit itself. An impact stronger than the controlling force is applied to the shake correction unit even during the duration of shake correction control, superfluous movements may likewise occur, resulting in damage to the shake correction unit.

In the present embodiment, in order to prevent the occurrence of such damage, a unit configured to prevent rolling is provided between the first lens holding member 2 and the base member 5, and likewise, a unit configured to prevent rolling is provided between the second lens holding member 4 and the base member 5. More specifically, boss-like first rotation regulating units 5d are provided at two positions in an integral manner with the base member 5, and the first rotation regulating units 5d are inserted into hole-shaped first regulated rotation units 2c provided at two positions in the first lens holding member 2. Likewise, boss-like second rotation regulating units 5e are provided at two positions in an integral manner with the base member 5, and the second rotation regulating units 5e are inserted into hole-shaped second regulated rotation units 4d provided at two positions in the second lens holding member 4.

As a result, rolling around the optical axis of the shake correction lens group (first lens 1 and second lens 3) is restricted by the relationship between the first rotation regulating units 5d and the first regulated rotation units 2c and the relationship between the second rotation regulating units 5e and the second regulated rotation units 4d. In addition, the insertion of the bosses into the respective holes can prevent violent movement, such as the falling of the shake correction lens group with respect to the optical axis, and thereby any damage to the shake correction unit can be prevented. Furthermore, a method for preventing the rolling of the first lens holding member 2 and the second lens holding member 4 is carried out in such a manner that boss-like posts are inserted into holes to make the posts abut against the end surface of the holes, whereby the rolling can be prevented without providing a complex configuration. In the present embodiment, the shape of the hole of the first regulated rotation units 2c and the second regulated rotation units 4d includes a plane parallel to the X axis and a plane parallel to the Y axis. In other words, the shape of the hole is a square when viewed from a direction along the optical axis, and corresponds to the movable range of the first lens holding member 2 during a shake correction operation. Therefore, the spacing of minimum gaps spacing between the bosses and the holes formed in the first regulated rotation units 2c and the second regulated rotation units 4d can be made constant at any position within the movable range of the first lens holding member 2, whereby the rolling regulation can be performed stably and securely.

Under the conditions of normal use, the regulated movement range units 2b and the movement range regulating units 5c, which regulate the range of movement of the shake correction lens group, are brought into abutment prior to the first rotation regulating units 5d and first regulated rotation units 2c and the second rotation regulating units 5e and the second regulated rotation units 4d, which regulate the rolling of the first lens holding member 2 and the second lens holding member 4. Here, when an external force such as impact is applied to the shake correction unit, the rolling of the second lens holding member 4 is to be regulated after the first regulation of the rolling of the first lens holding member 2. As described above, the range of movement of the shake correction lens group is determined by the regulated movement range units 2b in the first lens holding member 2 and the movement range regulating units 5c in the base member 5. Hence, if the rolling can be precisely prevented mainly by the first lens holding member 2, accuracy may also be improved. On the contrary, if the second lens holding member 4 is regulated beforehand, regulation may be started before the regulated movement range units 2b in the first lens holding member 2 are brought into abutment with the movement range regulating units 5c in the base member 5, which may cause functional difficulties. In view of the above, the present embodiment is designed such that the rolling of the second lens holding member 4 is regulated after the first regulation of the rolling of the first lens holding member 2. With this arrangement, the first lens holding member 2 of reference is held at first, and thereby the rolling including tilting is absorbed by the rolling preventing function of the second lens holding member 4. Consequently, superfluous operations other than a shake correction operation can be avoided while retaining this function, whereby any damage to the shake correction unit can be prevented.

FIG. 13 is a flowchart of a process of the operation of the digital camera of the present embodiment, from power-on to termination of shooting. In step (hereinafter referred to as "S") 10, the operator turns on the power of the photographic apparatus. In S20, the CPU 46 gives an instruction to the zoom motor drive unit 29 to cause CW (clockwise) rotation of the barrel drive motor. In S30, the CPU 46 stops the barrel drive motor after confirming that the photographic lens barrel 49 has been moved to an image-taking position by the driving force of the barrel drive motor. As a consequence, the photographic lens barrel 49 changes from the state shown in FIG. 1 to the state shown in FIG. 2.

In S40, the operator turns on the release button 13. In S50, the CPU 46 performs photometry to thereby obtain luminance information on an object. In S60, the CPU 46 determines whether or not the luminance information that has been obtained in S50 indicates a higher luminance than a default luminance. If the obtained luminance information indicates a higher luminance than the default luminance (YES in S60), the process advances to S70. If the obtained luminance information indicates a lower luminance than the default luminance (NO in S60), the process advances to S80, and thereby the CPU 46 holds the diaphragm 34 in a state retracted from the imaging optical path without carrying out an operation for extending the diaphragm 34 into the imaging optical path. In S70, the CPU 46 causes the diaphragm 34 to extend into the imaging optical path to change the amount of incident light since the obtained luminance information indicates a higher luminance than the default luminance. In S80, the CPU 46 operates the focus unit 30 to move the focus unit 30 to a position where the object is in focus.

In S90, an image pickup operation is started. In S100, the CPU 46 switches the shutter 33 from its open state to its closed state to block incident light. In S110, the image pickup operation is terminated. In S120, the CPU 46 causes the diaphragm 34 to retract from the imaging optical path. In S130, the CPU 46 moves the focus unit 30 to its initial position and then terminates its operations.

As explained in the foregoing, according to the present embodiment, a diaphragm and a shutter can be arranged within the shake correction lens group, and thereby the space in the lens group can be used efficiently. In addition, as a lens configuration, the effective diameter of a front lens can be reduced (in the optical design) by the arrangement of the diaphragm rearwardly in the lens group, whereby an exterior shape can be reduced in size. Thus, a small sized shake correction unit and a small sized imaging apparatus can be realized. In other words, the space within the lens group, which has not been used in a conventional digital camera, can be effectively used as a space for a diaphragm and a shutter. Consequently, an imaging lens barrel can be reduced in thickness, whereby the degree of freedom for optical design increases. Since an iris diaphragm aperture is used, the aperture shape can be brought close to a circular shape, resulting in an image having a blur. Furthermore, the first lens holding unit and the second lens holding unit are joined together by providing a snap-fit structure, and thereby the assembly can be made in a simple way. Dissembling can also be made easily.

The present invention is not limited to the above described embodiment, but various changes and modifications can be made, which should not be excluded from within the scope of the present invention.

While the present embodiment has been described for the case in which a non-interchangeable lens digital camera is used, that is, where an imaging lens barrel is integral with a camera body, the present invention is not limited thereto. For example, the lens may be an interchangeable lens, and the camera may be a film camera, a telescope, or the like.

While the present embodiment has been described for the case in which the diaphragm shutter unit 6 is arranged at a position between the first lens 1 and the second lens 3, the present invention is not limited thereto. For example, only a shutter may be provided within the shake correction lens group, or only a diaphragm may be provided within the shake correction lens group.

While the present embodiment has been described for the case in which the shake correction coil 7 is provided on the base 5 and the magnet 8 is provided on the first lens holding member 2, the present invention is not limited thereto. The magnet 8 may be provided on either one of them and the coil 7 may be provided on the other. For example, the magnet 8 may be provided on the base 5 and the coil 7 may be provided on the first lens holding member 2.

This application claims the benefit of Japanese Patent Application No. 2009-009354 filed Jan. 19, 2009 which is hereby incorporated by reference herein in its entirety.

What is claimed is:

1. A shake correction unit comprising:
a first lens unit that holds a first lens and is movable in a direction perpendicular to an optical axis of the first lens; and
a second lens unit that holds a second lens and is attached to the first lens unit and moves in a direction perpendicular to the optical axis together with the first lens unit,
at least one of a shutter and an iris diaphragm having a changeable opening diameter;
a base member that holds at least one of the shutter and the diaphragm and is disposed between the first lens unit and the second lens unit;
wherein at least one of the shutter and the iris diaphragm is disposed between the first lens unit and the second lens unit,
wherein the second lens unit has three receiving units and three engaging units, wherein the receiving unit extends through the base member so as to abut the first lens unit, and
wherein the engaging unit extends through the base member so as to engage with the first lens unit.

2. The shake correction unit according to claim 1, further comprising:
a plurality of balls that are disposed between the base member and the first lens unit;
an urging unit configured to urge the base member and the first lens unit in a direction toward each other;
a magnet provided on the first lens unit; and
a coil and a position detecting unit that are disposed so as to sandwich the magnet in a direction along the optical axis, while one of the coil and the position detecting unit is provided on the base member.

3. The shake correction unit according to claim 2, wherein the engaging unit engages with the first lens unit with a snap-fit structure.

4. An imaging apparatus comprising:
the shake correction unit according to claim 1; and
an imaging unit that captures an image obtained through the shake correction unit.

5. The shake correction unit according to claim 1;
wherein the first lens unit and the second lens unit are engaged at three positions.

6. The shake correction unit according to claim 1;
wherein the first lens unit and the second lens unit are engaged with each other with extending through the base member.

7. The shake correction unit according to claim 1;
wherein the base member has an aperture through which an imaging light flux passes, and
wherein an interior wall portion of the aperture has a movement range regulating unit which restricts the movement of the first lens unit.

8. The shake correction unit according to claim 1;
wherein the base member has boss-like rotation regulating units, and
wherein each of the first lens unit and the second lens unit has a hole-shaped regulated rotation unit into which the rotation regulating units are inserted.

9. The shake correction unit according to claim 1;
wherein the regulated rotation unit corresponds to the movable range of the first lens unit and the second lens unit.

10. The shake correction unit according to claim 1;
wherein the rotation regulating unit and the regulated rotation unit are provided so that, when an exterior force is applied to the shake correction unit, a rolling of the second lens unit is to be regulated after a rolling of the first lens unit is regulated.

11. A shake correction unit comprising:
a first lens unit that holds a first lens and is movable in a direction perpendicular to an optical axis of the first lens; and
a second lens unit that holds a second lens and is attached to the first lens unit and moves in a direction perpendicular to the optical axis together with the first lens unit;
at least one of a shutter and an iris diaphragm having a changeable opening diameter;
a base member that holds at least one of the shutter and the diaphragm and is disposed between the first lens unit and the second lens unit;
wherein at least one of the shutter and the iris diaphragm is disposed between the first lens unit and the second lens unit, and
wherein the first lens unit and the second lens unit are engaged with each other at a circumference of at least one of the shutter and the iris diaphragm, with extending through the base member.

12. The shake correction unit according to claim 11, further comprising:
a plurality of balls that are disposed between the base member and the first lens unit;
an urging unit configured to urge the base member and the first lens unit in a direction toward each other;
a magnet provided on the first lens unit; and
a coil and a position detecting unit that are disposed so as to sandwich the magnet in a direction along the optical axis, while one of the coil and the position detecting unit is provided on the base member.

13. The shake correction unit according to claim 11,
wherein the second lens unit has three receiving units and three engaging units,
wherein the receiving unit extends through the base member so as to abut the first lens unit, and
wherein the engaging unit extends through the base member so as to engage with the first lens unit.

14. The shake correction unit according to claim 13, wherein the engaging unit engages with the first lens unit with a snap-fit structure.

15. An imaging apparatus comprising:
the shake correction unit according to claim 11; and
an imaging unit that captures an image obtained through the shake correction unit.

16. The shake correction unit according to claim 11;
wherein the first lens unit and the second lens unit are engaged at three positions.

17. The shake correction unit according to claim 11;
wherein the base member has an aperture through which an imaging light flux passes, and
wherein an interior wall portion of the aperture has a movement range regulating unit which restricts the movement of the first lens unit.

18. The shake correction unit according to claim 11;
wherein the base member has boss-like rotation regulating units, and
wherein each of the first lens unit and the second lens unit has a hole-shaped regulated rotation unit into which the rotation regulating units are inserted.

19. The shake correction unit according to claim 11;
wherein the regulated rotation unit corresponds to the movable range of the first lens unit and the second lens unit.

20. The shake correction unit according to claim 11;
wherein the rotation regulating unit and the regulated rotation unit are provided so that, when an exterior force is applied to the shake correction unit, a rolling of the second lens unit is to be regulated after a rolling of the first lens unit is regulated.

* * * * *